United States Patent
Nagahama et al.

[11] Patent Number: 6,140,375
[45] Date of Patent: Oct. 31, 2000

[54] MICROEMULSION

[75] Inventors: Tohru Nagahama; Kazuo Hasegawa; Toshiaki Nakajima; Yuji Ito, all of Tokyo, Japan

[73] Assignee: Taisho Pharmaceutical Co., Ltd.

[21] Appl. No.: 09/180,744

[22] PCT Filed: May 23, 1997

[86] PCT No.: PCT/JP97/01736

§ 371 Date: Nov. 17, 1998

§ 102(e) Date: Nov. 17, 1998

[87] PCT Pub. No.: WO97/44124

PCT Pub. Date: Nov. 27, 1997

[30] Foreign Application Priority Data

May 23, 1996 [JP] Japan ..................... 8-128110

[51] Int. Cl.[7] .............. C09K 3/00; B01F 17/00; B01F 3/08; A01N 61/00
[52] U.S. Cl. ............... 516/73; 514/938; 514/943; 514/937
[58] Field of Search ............... 516/73; 514/938, 514/937, 943

[56] References Cited

U.S. PATENT DOCUMENTS 5,767,180 6/1998 Leube ...................... 524/145

FOREIGN PATENT DOCUMENTS

| 697206 | 2/1996 | European Pat. Off. . |
| 56-037040 | 4/1981 | Japan . |
| 62-250941 | 10/1987 | Japan . |
| 7227227 | 8/1995 | Japan . |
| 63107740 | 5/1998 | Japan . |

*Primary Examiner*—Jill Warden
*Assistant Examiner*—Monique T. Cole
*Attorney, Agent, or Firm*—Lorusso & Loud

[57] ABSTRACT

The present invention relates to a microemulsion comprising: (1) one or two selected from decaglycerol stearates having an HLB of 14 or greater and sucrose stearates having an HLB of 18 or greater, (2) one or tow selected from decaglycerol myristates having an HLB of 13 or greater and decaglycerol laurates having an HLB of 14 or greater, (3) a fat-soluble ingredient, and (4) a water-soluble polyhydric alcohol, wherein the weight ratio of (1) and (2) if 1:05–1:6.

8 Claims, No Drawings

MICROEMULSION

TECHNICAL FIELD

The present invention relates to microemulsions containing fat-soluble ingredients and more specifically to microemulsions containing fat-soluble ingredients which are used in the field of pharmaceuticals, foods, cosmetics, etc., which have very small particle sizes, and which are stable in aqueous solutions.

BACKGROUND ART

Generally, the smaller the particle sizes of emulsions are, the higher their stability in aqueous solutions is. There are known several methods to obtain emulsions having small particle sizes by the addition of polyhydric alcohols to mixtures in which oily phases and nonionic surfactants have been dissolved followed by the emulsification thereof (Japanese Unexamined Patent Publication (Kokai) No. 62-250941, Japanese Examined Patent Publication (Kokoku) No. 63-61050, and Japanese Unexamined Patent Publication (Kokai) No. 63-107740). However, the particle sizes of the emulsions obtained by these methods are not small enough and hence it was difficult to secure stability in low-viscosity aqueous solutions. An alternative method for reducing particle sizes involves the use of a high-pressure homogenizer which exerts forcefully a physically great power to emulsions. But this requires extensive equipment, which significantly contributed to high cost of the method. Furthermore, although the emulsions obtained in this method are relatively stable in aqueous solutions having near-neutral pH or low concentrations of ionic substances, they have the problem of being unstable in aqueous solutions of pH 2.5–5.0 which are often used for medicinal beverages, refreshing beverages, etc., in aqueous solutions which contain inorganic salts, salts of organic acids and the like and which have high concentrations of ionic substances as high as 0.1–5% by weight, and thereby are easy to form creams, precipitates or the like.

DISCLOSURE OF THE INVENTION

It is an object of the present invention to provide microemulsions containing fat-soluble ingredients which have very small particle sizes of 200 nm or smaller and which are stable for a long period of time in an aqueous solution, in particular even in an aqueous solution of pH 2.5–5.0 or an aqueous solution of high ionic concentrations wherein the concentrations of ionic substances are as high as 0.1–5% by weight.

After intensive research to attain the above objective, the inventors of the present invention have found that by combining specific nonionic surfactants at specific ratios, microemulsions containing fat-soluble ingredients with particle sizes as small as 10–150 nm can be obtained and that the microemulsions are very stable for a long period of time even in aqueous solutions of pH 2.5–5.0 or an aqueous solution of high ionic concentrations wherein the concentrations of ionic substances are as high as 0.1–5% by weight, and thus have completed the present invention.

Thus, the present invention is a microemulsion comprising (1) one or two selected from decaglycerol stearates having an HLB of 14 or greater and sucrose stearates having an HLB of 18 or greater, (2) one or two selected from decaglycerol myristates having an HLB of 13 or greater and decaglycerol laurates having an HLB of 14 or greater, (3) a fat-soluble ingredient, and (4) a water-soluble polyhydric alcohol, wherein the weight ratio of (1) and (2) is 1:0.5–1:6.

The present invention is characterized in that specific nonionic surfactants are combined at specific ratios, resulting thereby in microemulsions which have particle sizes of 200 nm or smaller and which are very stable for a long period of time even in an aqueous solution of pH 2.5–5.0 or an aqueous solution of high ionic concentrations wherein the concentrations of ionic substances are as high as 0.1–5% by weight It is necessary to reduce the particle sizes to 200 nm or smaller in order to secure the stability of microemulsions in aqueous low-viscosity solutions. In particular, it is preferred that the particle sizes are 10–150 nm.

The HLB of decaglycerol stearates, nonionic surfactants for use in the present invention, is 14 or greater, preferably 15 or greater. The decaglycerol stearates having an HLB of 14 or greater mean the decaglycerol stearates having a monostearate content of 45% or greater. Sucrose stearates are esters of sucrose and stearic acid, and the HLB of sucrose stearates is 18 or greater, preferably 19 or greater. The sucrose stearates having an HLB of 18 or greater mean the sucrose stearates having a monostearate content of 90% or greater. The HLB of decaglycerol myristates is 13 or greater, preferably 14 or greater. The decaglycerol myristates having an HLB of 13 or greater mean the decaglycerol myristates having a monomyristate content of 45% or greater. The HLB of decaglycerol laurates is 14 or greater, preferably 15 or greater. The decaglycerol laurates having an HLB of 14 or greater mean the decaglycerol laurates having a monolaurate content of 45% or greater.

Thus, in the decaglycerol stearates, the sucrose stearates, the decaglycerol myristates, and the decaglycerol laurates for use in the present invention, the content of monoesters is greater than a certain value, and the monoesters with a purity of 100% may be used.

The weight ratio of one or two selected from decaglycerol stearates having an HLB of 14 or greater and sucrose stearates having an HLB of 18 or greater to one or two selected from decaglycerol myristates having an HLB of 13 or greater and decaglycerol laurates having an HLB of 14 or greater is 1:0.5–1:6, preferably 1:0.6–1:5, and more preferably 1:0.7–1:4.

Unless specific combinations above are used, even nonionic surfactants having an HLB of 12 or greater cannot yield microemulsions having the particle sizes of 200 nm or smaller. Or, even when such microemulsions were obtained, their stability at low temperatures (5° C.) cannot be secured.

Fat-soluble ingredients for use in the present invention include fat-soluble vitamins such as vitamins A, D, E, F, K, and U, and carotenoids, and derivatives thereof, as well as fat-soluble drugs such as γ-oryzanol and the like. Among these, vitamin Ds (for example, vitamin $D_2$, vitamin $D_3$, activated vitamin D, and metabolites and derivatives thereof) and vitamin E are especially effective.

Furthermore, to the fat-soluble ingredients used in the present invention can be added various oily substances including vegetable and animal oils such as avocado oil, camellia oil, turtle oil, macadamia nut oil, corn oil, mink oil, olive oil, rape seed oil, yolk oil, sesame oil, wheat germ oil, sasanqua oil, castor oil, safflower oil, cotton seed oil, soy bean oil, peanut oil, cacao butter, and lanolin, and middle-chain fatty acid triglycerides such as tricapric acid glyceride, and tricaprylic acid glyceride.

The weight ratio of nonionic surfactants and fat-soluble ingredients (or the total amount of fat-soluble ingredients and oily substances) is usually in the range of 1:0.1–1:3, preferably 1:0.4–1:3, more preferably 1:0.2–1:2. When the weight ratio of fat-soluble ingredients to nonionic surfactants exceed 3, it is impossible to obtain microemulsions having the particle sizes of 200 nm or smaller.

Examples of water-soluble polyhydric alcohols include ethylene glycol, propylene glycol, 1,3-butylene glycol, 1,4-butylene glycol, dipropylene glycol, polypropylene glycol, glycerol, diglycerol, polyglycerol, polyethylene glycol, erythritol, xylitol, sorbitol, maltitol, lactitol, mannitol, trehalose, sugaralcohol derived from digestion product of starch and the like. Among these water-soluble polyhydric alcohols, glycerol, diglycerol, polyglycerol, and sorbitol are particularly preferred. When the emulsions of the present invention are to be prepared, these water-soluble polyhydric alcohols are usually used in the form of a hydrous product. The weight ratio of water-soluble polyhydric alcohols to water in this case is preferably in the range of 95:5–50:50, and most preferably 90:10–55:45.

The weight ratio of the total amount of fat-soluble ingredients and nonionic surfactants for use in the present invention to a hydrous product of a water-soluble polyhydric alcohol (mixture of water-soluble polyhydric alcohols and water) is preferably in the range of 1:0.05–1:10, and most preferably 1:0.1– 1:8.

When an aqueous solution of 85% glycerol is used as a water-soluble polyhydric alcohol, the weight ratio of the aqueous solution of 85% glycerol to the total amount of nonionic surfactants is preferably 1:0.5–1:1.45, and the weight ratio of the aqueous solution of 85% glycerol to a fat-soluble ingredient (or the total amount of a fat-soluble ingredient and an oily substance) is preferably 1:0.37–1:3.7.

The microemulsions containing fat-soluble ingredients of the present invention can be obtained by methods commonly used to obtain emulsions. Thus, one or two selected from the above decaglycerol stearates and the above sucrose stearates, one or two selected from the above decaglycerol myristates and the above decaglycerol laurates, and a fat-soluble ingredient are mixed, optionally heated, and then a water-soluble polyhydric alcohol is added thereto in portions while stirring to obtain the fat-soluble ingredients-containing microemulsion of the present invention.

The microemulsions containing fat-soluble ingredients thus obtained are diluted in water as appropriate, and used for the applications of pharmaceuticals, foods, cosmetics, and the like. Generally, the dilution factor in this case is, but not limited to, 10–100000.

The microemulsions diluted in water as appropriate have the particle sizes of 200 nm or smaller and are very stable for a long period of time in an aqueous solution of pH 2.5–5.0 or an aqueous solution of high ionic concentrations wherein the concentrations of ionic substances are as high as 0.1–5% by weight.

The ionic substances as used herein are substances that form ions in aqueous solutions. They are, for example, inorganic salts such as sodium chloride, potassium chloride, calcium chloride, magnesium chloride, disodium hydrogen phosphate, sodium dihydrogen phosphate, sodium carbonate, and sodium bicarbonate, and alkaline metal salts (for example, sodium salts and potassium salts) or alkaline earth metal salts (for example, calcium salts and magnesium salts) of organic acids such as citric acid, malic acid, gluconic acid, tartaric acid, fumaric acid, succinic acid, lactic acid, ascorbic acid, erysorbic acid, and aspartic acid, and they may include one or more of the above.

When the microemulsions containing fat-soluble ingredients of the present invention are used for pharmaceutical applications, other ingredients that do not affect the present invention may be blended. They are, for example, water-soluble vitamins such as vitamins $B_1$, $B_2$, $B_6$, and $B_{12}$, vitamin C, pantothenic acid, niacin, biotin, folic acid, and carnitine chloride, and salts and derivatives thereof, taurine, inositol, sodium chondroitin sulfate, caffeine, crude drug extracts, and the like. Furthermore, pharmaceutically acceptable sweetening agents, pH conditioners, preservatives, perfumes, coloring agents, thickeners, chelating agents, ethanol, and the like may be optionally added. The sweetening agents include, for example, sucrose, lactose, fructose, glucose, sorbitol, maltitol, erythritol, xylitol, trehalose, glycerol, lactitol, stevia extracts, and the like. The pH conditioners include, for example, lactic acid, citric acid, malic acid, succinic acid, fumaric acid, tartaric acid, and phosphoric acid, and salts thereof. The preservatives include, for example, parabens such as methyl paraben, ethyl paraben, propyl paraben, and butyl paraben, benzoic acid and salts thereof. The perfumes include, for example, fruity flavors such as oranges, grape fruits, apples, lemons, lime, tangerines, Chinese lemons, Citrus unshiu, Citrus natsudaidai, grapes, strawberries, pineapples, bananas, peaches, melons, watermelons, plums, cherries, pears, apricots, red currants, Japanese apricots, mangos, mangosteens, guavas, raspberries, and blueberries, black tea, green tea, cocoa, chocolate, coffee, almond, maple, vanilla, whiskey, brandy, ram, wine, liquors, cocktails, mint, and the like, and they may be used alone or as a mixed flavor of two or more.

BEST MODE FOR CARRYING OUT THE INVENTION

The present invention will now be explained in more detail with reference to the following working examples and the test example.

The particle sizes described herein are all mean particle sizes measured using the dynamic light scattering method, and specifically they were determined using NICOMP Model 370 (manufactured by HIAC/ROYCO).

WORKING EXAMPLE 1

| | |
|---|---|
| (1) Tocopherol acetate | 50 g |
| (2) Decaglycerol myristate (HLB 14) | 25 g |
| (3) Sucrose stearate (HLB 19) | 8 g |
| (4) Aqueous solution of 70% glycerol | 50 g |

(1), (2), and (3) were mixed at 60–70 ° C. After the mixture was returned to room temperature, (4) was added thereto in portions to obtain a gel. The product was diluted by 50-fold with purified water to obtain a homogeneous microemulsion having a particle size of 90 nm.

WORKING EXAMPLE 2

| | |
|---|---|
| (1) Tocopherol acetate | 50 g |
| (2) Decaglycerol myristate (HLB 14) | 15 g |
| (3) Decaglycerol stearate (HLB 15) | 15 g |
| (4) Aqueous solution of 80% glycerol | 30 g |

(1), (2), and (3) were mixed at 60 - 70 0C. After the mixture was returned to room temperature, (4) was added thereto in portions to obtain a gel. The product was diluted by 50-fold with purified water to obtain a homogeneous microemulsion having a particle size of 60 nm.

WORKING EXAMPLE 3

| | |
|---|---|
| (1) Tocopherol acetate | 50 g |
| (2) Decaglycerol laurate (HLB 15.5) | 15 g |
| (3) Decaglycerol myristate (HLB 14) | 15 g |
| (4) Decaglycerol stearate (HLB 15) | 15 g |
| (5) Sucrose stearate (HLB 19) | 8 g |
| (6) Aqueous solution of 70% glycerol | 70 g |

(1), (2), (3), (4), and (5) were mixed at 60–70° C. After the mixture was returned to room temperature, (6) was added thereto in portions to obtain a gel. The product was diluted by 50-fold with purified water to obtain a homogeneous microemulsion having a particle size of 110 nm.

WORKING EXAMPLE 4

| | |
|---|---|
| (1) Retinol acetate | 1 g |
| (2) Tocopherol | 5 g |
| (3) Ergocalciferol | 1 g |
| (4) Soybean oil | 20 g |
| (5) Tricapric acid glyceride | 10 g |
| (6) Decaglycerol laurate (HLB 15.5) | 9 g |
| (7) Decaglycerol myristate (HLB 14) | 21 g |
| (8) Sucrose stearate (HLB 19) | 8 g |
| (9) Aqueous solution of 85% propylene glycol | 100 g |

(1), (2), (3), (4), (5), (6), (7), and (8) were mixed at 60–70° C. After the mixture was returned to room temperature, (9) was added thereto in portions to obtain a gel. The product was diluted by 50-fold with purified water to obtain a homogeneous microemulsion having a particle size of 130 nm.

WORKING EXAMPLE 5

| | |
|---|---|
| (1) Tocopherol acetate | 50 g |
| (2) γ-oryzanol | 5 g |
| (3) Decaglycerol myristate (HLB 14) | 12 g |
| (4) Decaglycerol stearate (HLB 15) | 16 g |
| (5) Aqueous solution of 80% glycerol | 40 g |

(1), (2), (3), and (4) were mixed at 60–70° C. After the mixture was returned to room temperature, (5) was added thereto in portions to obtain a gel. The product was diluted by 50-fold with purified water to obtain a homogeneous microemulsion having a particle size of 80 nm.

WORKING EXAMPLE 6

| | |
|---|---|
| (1) β-carotene | 1 g |
| (2) Tocopherol | 5 g |
| (3) Cholecalciferol | 1 g |
| (4) Olive oil | 10 g |
| (5) Tricapryric acid glyceride | 10 g |
| (6) Decaglycerol laurate (HLB 15.5) | 3 g |
| (7) Decaglycerol myristate (HLB 14) | 10 g |
| (8) Decaglycerol stearate (HLB 15) | 13 g |
| (9) Sucrose stearate (HLB 19) | 5 g |
| (10) Aqueous solution of 65% glycerol | 75 g |

(1), (2), (3), (4), (5), (6), (7), (8), and (9) were mixed at 60–70° C. After the mixture was returned to room temperature, (10) was added thereto in portions to obtain a gel. The product was diluted by 50-fold with purified water to obtain a homogeneous microemulsion having a particle size of 105 nm.

COMPARATIVE EXAMPLE 1

| | |
|---|---|
| (1) Tocopherol acetate | 50 g |
| (2) Decaglycerol myristate (HLB 14) | 50 g |
| (3) Aqueous solution of 70% glycerol | 50 g |

(1) and (2) were mixed at 60–70° C. After the mixture was returned to room temperature, (3) was added thereto in portions. The product was diluted by 50-fold with purified water to obtain an emulsion having a particle size of 270 nm.

COMPARATIVE EXAMPLE 2

| | |
|---|---|
| (1) Tocopherol acetate | 50 g |
| (2) Sucrose stearate (HLB 12) | 50 g |
| (3) Aqueous solution of 70% glycerol | 50 g |

(1) and (2) were mixed at 60–70° C. After the mixture was returned to room temperature, (3) was added thereto in portions. The product was diluted by 50-fold with purified water to obtain an emulsion having a particle size of 350 nm.

COMPARATIVE EXAMPLE 3

| | |
|---|---|
| (1) Tocopherol acetate | 50 g |
| (2) Sucrose stearate (HLB 19) | 50 g |
| (3) Aqueous solution of 70% glycerol | 50 g |

(1) and (2) were mixed at 60–70° C. After the mixture was returned to room temperature, (3) was added thereto in portions. The product was diluted by 50-fold with purified water to obtain an emulsion having a particle size of 400 nm.

COMPARATIVE EXAMPLE 4

| | |
|---|---|
| (1) Tocopherol acetate | 50 g |
| (2) γ-oryzanol | 5 g |
| (3) Decaglycerol myristate (HLB 14) | 7 g |
| (4) Sucrose stearate (HLB 19) | 50 g |
| (5) Aqueous solution of 70% sorbitol | 80 g |

(1), (2), (3), and (4) were mixed at 60–70° C. After the mixture was returned to room temperature, (5) was added thereto in portions. The product was diluted by 50-fold with purified water to obtain an emulsion having a particle size of 410 nm.

TEST EXAMPLE

Experiments were conducted to compare the microemulsions obtained in the Working Examples and the emulsions obtained in the Comparative Examples. The pH was adjusted to be in the range of 2.5–6.0 by adding an aqueous solution of 1 N NaOH to an aqueous solution of 0.1% malic acid. The ionic concentrations were adjusted as concentrations of saline by adding sodium chloride to an aqueous solution of 0.1% malic acid of pH 6.0. These samples were filled in 5 ml ampoules and the ampoules were sealed. Then the changes with time in the characteristics of the emulsions at 5° C. and 40° C. were observed. The results are shown in Tables 1 and 2.

The microemulsions containing the fat-soluble ingredients of Working Examples 1–6 were superior to the emulsions of Comparative Examples 1–4 in their stability at low pH and their stability in high ionic concentrations.

TABLE 1 pH of aqueous solutions and stability of emulsions (characteristics)

|  |  | Working Example | | | | | | Comparative Example | | | |
|---|---|---|---|---|---|---|---|---|---|---|---|
|  |  | 1 | 2 | 3 | 4 | 5 | 6 | 1 | 2 | 3 | 4 |
| 5° C. | pH 2.5 | ○ | ○ | ○ | ○ | ○ | ○ | ▼ | ▼ | ▼ | ▼ |
| 1 month | pH 4.0 | ○ | ○ | ○ | ○ | ○ | ○ | ▼ | ▼ | ▼ | ▼ |
|  | pH 5.0 | ○ | ○ | ○ | ○ | ○ | ○ | ○ | ○ | ▼ | ▼ |
|  | pH 6.0 | ○ | ○ | ○ | ○ | ○ | ○ | ○ | ○ | ○ | ○ |
| 5° C. | pH 2.5 | ○ | ○ | ○ | ○ | ○ | ○ | ▼ | ▼ | ▼ | ▼ |
| 6 months | pH 4.0 | ○ | ○ | ○ | ○ | ○ | ○ | ▼ | ▼ | ▼ | ▼ |
|  | pH 5.0 | ○ | ○ | ○ | ○ | ○ | ○ | ▼ | ▼ | ▼ | ▼ |
|  | pH 6.0 | ○ | ○ | ○ | ○ | ○ | ○ | ▼ | ▼ | ▼ | ▼ |
| 40° C. | pH 2.5 | ○ | ○ | ○ | ○ | ○ | ○ | X | ▲ | X | X |
| 1 month | pH 4.0 | ○ | ○ | ○ | ○ | ○ | ○ | ▲ | ▲ | X | X |
|  | pH 5.0 | ○ | ○ | ○ | ○ | ○ | ○ | ▲ | ▲ | ▲ | ▲ |
|  | pH 6.0 | ○ | ○ | ○ | ○ | ○ | ○ | ▲ | ○ | ○ | ○ |
| 40° C. | pH 2.5 | ○ | ○ | ○ | ○ | ○ | ○ | X | X | X | X |
| 6 months | pH 4.0 | ○ | ○ | ○ | ○ | ○ | ○ | X | X | X | X |
|  | pH 5.0 | ○ | ○ | ○ | ○ | ○ | ○ | X | X | X | X |
|  | pH 6.0 | ○ | ○ | ○ | ○ | ○ | ○ | X | ▲ | ▲ | ▲ |

○: No change,
▲: Creaming,
▼: Precipitation,
X: Complete separation

TABLE 2

Saline concentrations of aqueous solutions and stability of emulsions (characteristics)

|  |  | Working Example | | | | | | Comparative Example | | | |
|---|---|---|---|---|---|---|---|---|---|---|---|
|  |  | 1 | 2 | 3 | 4 | 5 | 6 | 1 | 2 | 3 | 4 |
| 5° C. | 0.1% | ○ | ○ | ○ | ○ | ○ | ○ | ○ | ○ | ○ | ○ |
| 1 month | 0.5% | ○ | ○ | ○ | ○ | ○ | ○ | ○ | ○ | ▼ | ▼ |
|  | 1.0% | ○ | ○ | ○ | ○ | ○ | ○ | ▼ | ▼ | ▼ | ▼ |
|  | 5.0% | ○ | ○ | ○ | ○ | ○ | ○ | ▼ | ▼ | ▼ | ▼ |
| 5° C. | 0.1% | ○ | ○ | ○ | ○ | ○ | ○ | ▼ | ▼ | ▼ | ▼ |
| 6 months | 0.5% | ○ | ○ | ○ | ○ | ○ | ○ | ▼ | ▼ | ▼ | ▼ |
|  | 1.0% | ○ | ○ | ○ | ○ | ○ | ○ | ▼ | ▼ | ▼ | ▼ |
|  | 5.0% | ○ | ○ | ○ | ○ | ○ | ○ | ▼ | ▼ | ▼ | ▼ |
| 40° C. | 0.1% | ○ | ○ | ○ | ○ | ○ | ○ | ○ | ○ | ○ | ○ |
| 1 month | 0.5% | ○ | ○ | ○ | ○ | ○ | ○ | ▲ | ○ | ▲ | ▲ |
|  | 1.0% | ○ | ○ | ○ | ○ | ○ | ○ | ▲ | ▲ | ▲ | ▲ |
|  | 5.0% | ○ | ○ | ○ | ○ | ○ | ○ | X | ▲ | ▲ | X |
| 40° C. | 0.1% | ○ | ○ | ○ | ○ | ○ | ○ | X | ▲ | ▲ | ▲ |
| 6 months | 0.5% | ○ | ○ | ○ | ○ | ○ | ○ | X | ▲ | ▲ | ▲ |
|  | 1.0% | ○ | ○ | ○ | ○ | ○ | ○ | X | X | X | X |
|  | 5.0% | ○ | ○ | ○ | ○ | ○ | ○ | X | X | X | X |

○: No change,
▲: Creaming,
▼: Precipitation,
X: Complete separation

INDUSTRIAL APPLICABILITY

The microemulsions of the present invention have very small particle sizes of 200 nm or smaller and are stable for a long period of time even when diluted in water. Furthermore, the microemulsions of the present invention are very stable even in an aqueous solution of pH 2.5–5.0 or an aqueous solution of high ionic concentrations wherein the concentrations of ionic substances are as high as 0.1–5% by weight, the conditions under which it has conventionally been believed to be difficult to secure stability of emulsions. From this, the microemulsions containing fat-soluble ingredients of the present invention permit wide applications into various products in the field of pharmaceuticals, foods, and cosmetics.

What is claimed is::

1. A microemulsion comprising:

(a) one or two members selected from the group consisting of decaglycerol stearates having an HLB of 14 or greater and sucrose stearates having an HLB or 18 or greater, (b) one or two members selected from the group consisting of decaglycerol myristates having an HLB of 13 or greater and decaglycerol laurates having an HLB of 14 or greater, (c) a fat-soluble ingredient, and (d) a water-soluble polyhydric alcohol, wherein the weight ratio of (a) to (b) 1:05.–1:6.

2. The microemulsion according to claim 1 wherein the water-soluble polyhydric alcohol is used as a hydrous product in which the weight ratio of the water-soluble polyhydric alcohol to water is 95:5–50:50.

3. The microemulsion according to claim 1 wherein the weight ratio of the total amount of (a) and (b) to (c) the fat-soluble ingredient is 1:0.1–1:3.

4. The microemulsion according to claim 1 having a particle size of 200 nm or smaller.

5. The microemulsion according to claim 1 which are stable even in an aqueous solution of pH 2.5–5.0 or an aqueous solution of high ionic concentrations wherein the concentrations of ionic substances are as high as 0.1–5% by weight.

6. The microemulsion according to claim 1 which is a pharmaceutical composition.

7. The microemulsion according to claim 6 wherein the fat-soluble ingredient is a fat-soluble vitamin or derivative thereof.

8. The microemulsion according to claim 6 wherein the fat-soluble ingredient is a fat-soluble drug.

* * * * *

UNITED STATES PATENT AND TRADEMARK OFFICE
CERTIFICATE OF CORRECTION

PATENT NO.   : 6,140,375
DATED        : October 31, 2000
INVENTOR(S)  : Nagahama et al.

It is certified that error appears in the above-identified patent and that said Letters Patent is hereby corrected as shown below:

Title page,
ABSTRACT,
Line 4, "tow" should read -- two --; and
Line 8, "1:05-1:6" should read -- 1:05-1:6 --.

Column 8,
Line 34, "1:05-1:6" should read -- 1:05-1:6 --.

Signed and Sealed this

First Day of January, 2002

Attest:

JAMES E. ROGAN
*Attesting Officer*   *Director of the United States Patent and Trademark Office*